United States Patent
Yu et al.

(10) Patent No.: US 10,207,652 B2
(45) Date of Patent: Feb. 19, 2019

(54) PARALLELOGRAM LINKAGE AUTOMATIC CLAMPING HOLDER

(71) Applicant: Benzhi (Shenzhen) Information Technology Co., Ltd., Shenzhen, Guangdong (CN)

(72) Inventors: Fan Yu, Shenzhen (CN); Weiyu Yang, Shenzhen (CN)

(73) Assignee: BENZHI (SHENZHEN) INFORMATION TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/956,715

(22) Filed: Apr. 18, 2018

(65) Prior Publication Data

US 2018/0304823 A1    Oct. 25, 2018

(30) Foreign Application Priority Data

Apr. 24, 2017    (CN) .......................... 2017 1 0271247

(51) Int. Cl.
| | | |
|---|---|---|
| A47G 1/00 | (2006.01) | |
| B60R 11/02 | (2006.01) | |
| B60R 7/08 | (2006.01) | |
| F16M 11/04 | (2006.01) | |
| B60R 11/00 | (2006.01) | |

(52) U.S. Cl.
CPC ............ *B60R 11/0241* (2013.01); *B60R 7/08* (2013.01); *F16M 11/041* (2013.01); *B60R 2011/0008* (2013.01); *B60R 2011/0059* (2013.01); *B60R 2011/0071* (2013.01)

(58) Field of Classification Search
CPC .................. B60R 11/0241; B60R 7/08; B60R 2011/0008; F16M 11/041

USPC ........... 248/316.1, 229.1, 229.2, 226.11, 585
See application file for complete search history.

(56) References Cited

U.S. PATENT DOCUMENTS

| | | | | |
|---|---|---|---|---|
| 8,240,628 B2* | 8/2012 | Huang | ................. | F16M 11/041 |
| | | | | 248/122.1 |
| 8,646,736 B2* | 2/2014 | Berry | ...................... | A45F 5/021 |
| | | | | 220/737 |
| 9,161,466 B2* | 10/2015 | Huang | ................. | H05K 5/0204 |
| 9,797,543 B2* | 10/2017 | Lin | ..................... | E05B 73/0082 |
| 2007/0262223 A1* | 11/2007 | Wang | .................. | B60R 11/0241 |
| | | | | 248/346.07 |
| 2012/0312936 A1* | 12/2012 | Huang | ................. | F16M 11/041 |
| | | | | 248/122.1 |

FOREIGN PATENT DOCUMENTS

| | | | |
|---|---|---|---|
| WO | WO-2018099337 A1 | * | 6/2018 |
| WO | WO-2018099338 A1 | * | 6/2018 |
| WO | WO-2018099340 A1 | * | 6/2018 |

* cited by examiner

*Primary Examiner* — Todd M Epps
(74) *Attorney, Agent, or Firm* — Leong C. Lei

(57) ABSTRACT

A parallelogram linkage automatic clamping holder includes a rear base, a bottom support arm, a left clamping arm, a right clamping arm, and a return elastic member. When in use, the bottom support arm is moved downward by the weight of a mobile phone. By the deformation principle of the parallelogram, clamping parts move inward obliquely upward to clamp the mobile phone automatically. The clamping surfaces of the clamping parts don't have an angle change to ensure that the mobile phone has a larger contact surface with the clamping surfaces, providing a better clamping effect.

7 Claims, 3 Drawing Sheets

PARALLELOGRAM LINKAGE AUTOMATIC CLAMPING HOLDER

BACKGROUND OF THE INVENTION

1. Field of the Invention

The present invention relates to a holder used for a mobile device, such as a mobile phone, and more particularly to a parallelogram linkage automatic clamping holder.

2. Description of the Prior Art

These days, with the popularity of mobile phones and other mobile devices, mobile phone holders have been widely used. Most of conventional mobile phone holders are operated manually for clamping a mobile phone. Some of the mobile phone holders have an automatic clamping design which is provided with a pressure sensor to detect whether or not a mobile phone is placed. A microcontroller according to the detected rotational state of the mobile phone controls an electric driver to achieve an automatic clamping function. This holder has a complex structure, high production cost, high power consumption, high failure rate, poor stability of use, and other deficiencies, so it is not suitable for popularization and application. Some holders use the weight of a mobile phone to link two clamping arms to turn so as to clamp the mobile phone, which solves the problem of power consumption. But, the linkage stability and the clamping effect are poor.

Accordingly, the inventor of the present invention has devoted himself based on his many years of practical experiences to solve these problems.

SUMMARY OF THE INVENTION

In view of the shortcomings of the prior art, the primary object of the present invention is to provide a parallelogram linkage automatic clamping holder. When in use, a bottom support arm is moved downward by the weight of a mobile phone. By the deformation principle of the parallelogram, clamping parts move inward obliquely upward to clamp the mobile phone automatically. The clamping surfaces of the clamping parts do not have an angle change to ensure that the mobile phone has a larger contact surface with the clamping surfaces, providing a better clamping effect.

In order to achieve the aforesaid object, the parallelogram linkage automatic clamping holder of the present invention comprises a rear base, a bottom support arm mounted to the rear base, a left clamping arm and a right clamping arm connected to two sides of the bottom support arm. A return elastic member is provided and fixed to the rear base. The return elastic member extends in a vertical direction and is used for linking the bottom support arm to return upward. One end of the return elastic member is fixed to the rear base, and another end of the return elastic member is connected to the bottom support arm.

The left clamping arm and the right clamping arm each includes a clamping part, a first connecting rod, and a second connecting rod. The bottom support arm is provided with a first fulcrum and a second fulcrum arranged vertically and spaced a distance apart from each other corresponding to the left clamping arm and the right clamping arm. The clamping part is provided with a third fulcrum and a fourth fulcrum arranged vertically and spaced a distance apart from each other. Inner and outer ends of the first connecting rod are pivotally connected to the corresponding first fulcrum and the third fulcrum, respectively. Inner and outer ends of the second connecting rod are pivotally connected to the corresponding second fulcrum and the fourth rotation fulcrum, respectively. The first fulcrum, the second fulcrum, the fourth fulcrum and the third fulcrum are sequentially connected to form a parallelogram structure.

The parallelogram linkage automatic clamping holder further comprises two limit portions for providing the left clamping arm and the right clamping arm with deformation fulcrums, respectively. The two limit portions are fixed to the rear base.

The present invention has obvious advantages and advantages as compared with the prior art. More specifically, it is understood from the above-described technical solution that the features of the present invention are the setting of the return elastic element and the linkage relationship between the bottom support arm and the left and right clamping arms. When a mobile device, such as a mobile phone, is placed on the clamping holder, the bottom support arm is moved downward by the weight of the mobile phone. By the deformation principle of the parallelogram, the clamping parts move inward obliquely upward along with the outer ends of the first connecting rods and the second connecting rods so as to clamp the mobile phone automatically. The clamping surfaces of the clamping parts does have an angle change to ensure that the mobile phone has a larger contact surface with the clamping surfaces, providing a better clamping effect. When the mobile phone is taken out, the bottom support arm is released from the weight of the mobile device, the bottom support arm is displaced upward along with the returning of the return elastic member, meanwhile, the clamping parts of the left clamping arm and the right clamping arm are moved outward obliquely downward so as to release the mobile device. The clamping holder may be used in a vehicle-mounted occasion. The clamping holder is user-friendly, easy to use, and practical. Its structure is simple, stable and reliable linkage, easy to produce, suitable for promotion and application

DETAILED DESCRIPTION OF THE PREFERRED EMBODIMENTS

Figure 1:
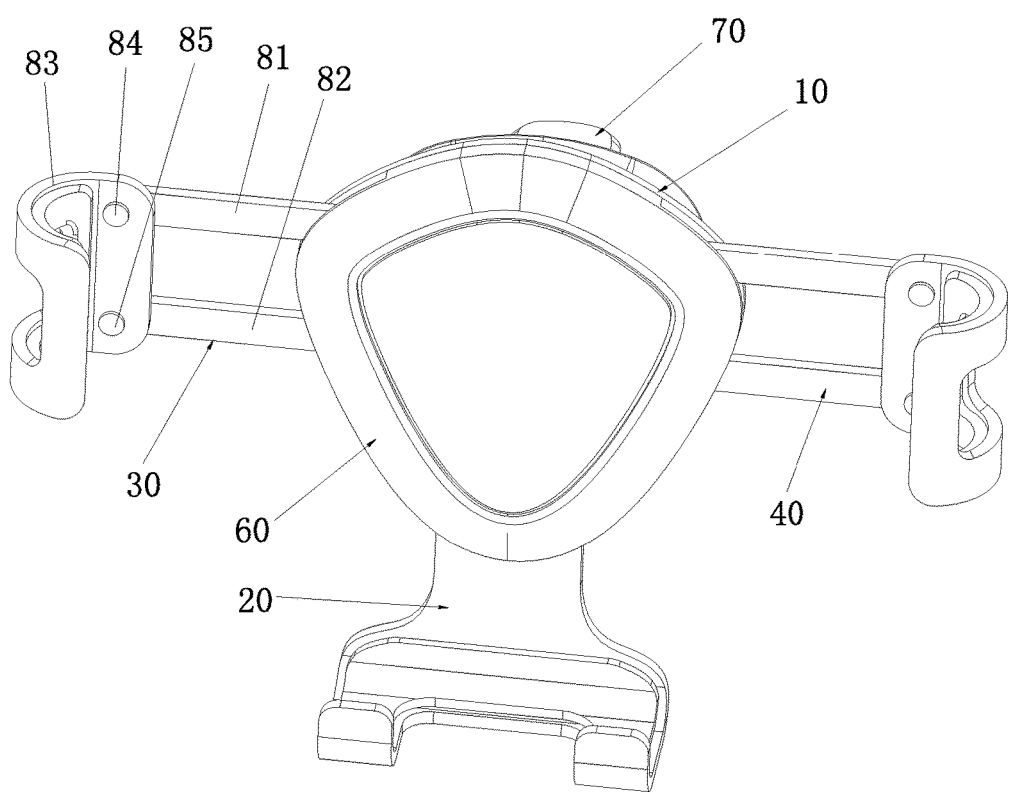
FIG. 1 is a front view according to an embodiment of the present invention.

Embodiments of the present invention will now be described, by way of example only, with reference to the accompanying drawings.

FIG. 1 to FIG. 5 illustrates a parallelogram linkage automatic clamping holder according to an embodiment of the present invention. The full-automatic holder is mainly used in a vehicle-mounted occasion, but not limited thereto. The parallelogram linkage automatic clamping holder comprises a rear base 10, a bottom support arm 20 mounted to the rear base 10, a left clamping arm 30, a right clamping arm 40, and a return elastic member 50.

The left clamping arm 30 and the right clamping arm 40 each include a clamping part 83, a first connecting rod 81, and a second connecting rod 82. The bottom support arm 20 is connected with a support part for supporting a mobile device. The bottom support arm 20 is provided with a first fulcrum 21 and a second fulcrum 22 arranged vertically and spaced a distance apart from each other corresponding to the left clamping arm 30 and the right clamping arm 40. The clamping part 83 is provided with a third fulcrum 84 and a fourth fulcrum 85 arranged vertically and spaced a distance apart from each other. Preferably, the second fulcrum 22 is located directly below the first fulcrum 21 in the vertical direction. The fourth fulcrum 85 is located directly below the third fulcrum 84 in the vertical direction. The bottom support arm 20 is moved up and down in the vertical direction by the weight of the mobile phone or the return action of the return elastic member. The left and right sides of the mobile phone to be clamped are usually vertical sides. Therefore, the clamping surface of the clamping part 83 is designed to extend in the vertical direction. Inner and outer ends of the first connecting rod 81 are pivotally connected to the corresponding first fulcrum 21 and the third fulcrum 84, respectively. Inner and outer ends of the second connecting rod 82 are pivotally connected to the corresponding second fulcrum 22 and the fourth rotation fulcrum 85, respectively. The first fulcrum 21, the second fulcrum 22, the fourth fulcrum 85 and the third fulcrum 84 are sequentially connected to form a parallelogram structure. The parallelogram linkage automatic clamping holder further includes two limit portions for providing the left clamping arm 30 and the right clamping arm 40 with deformation fulcrums, respectively. The two limit portions are fixed to the rear base 10. When a mobile device, such as a mobile phone, is placed on the holder, the bottom support arm 20 is moved downward by the weight of the mobile phone. By the deformation principle of the parallelogram, the clamping parts 83 move inward obliquely upward along with the outer ends of the first connecting rods 81 and the second connecting rods 82 so as to clamp the mobile phone automatically. The clamping surfaces of the clamping parts 83 do not have an angle change to ensure that the mobile phone has a larger contact surface with the clamping surfaces, providing a better clamping effect.

Figure 2:
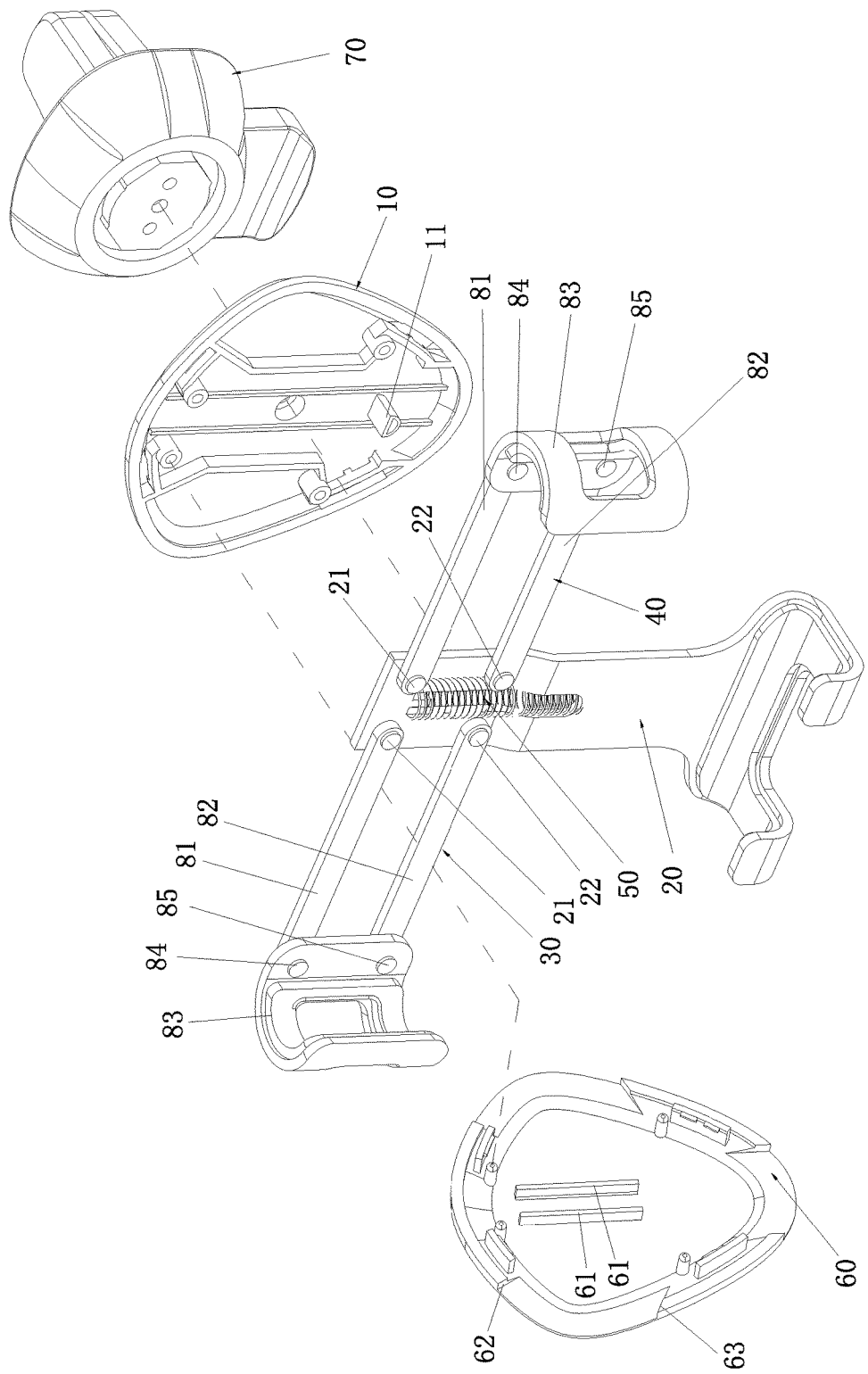
FIG. 2 is an exploded view according to the embodiment of the present invention.
Figure 3:
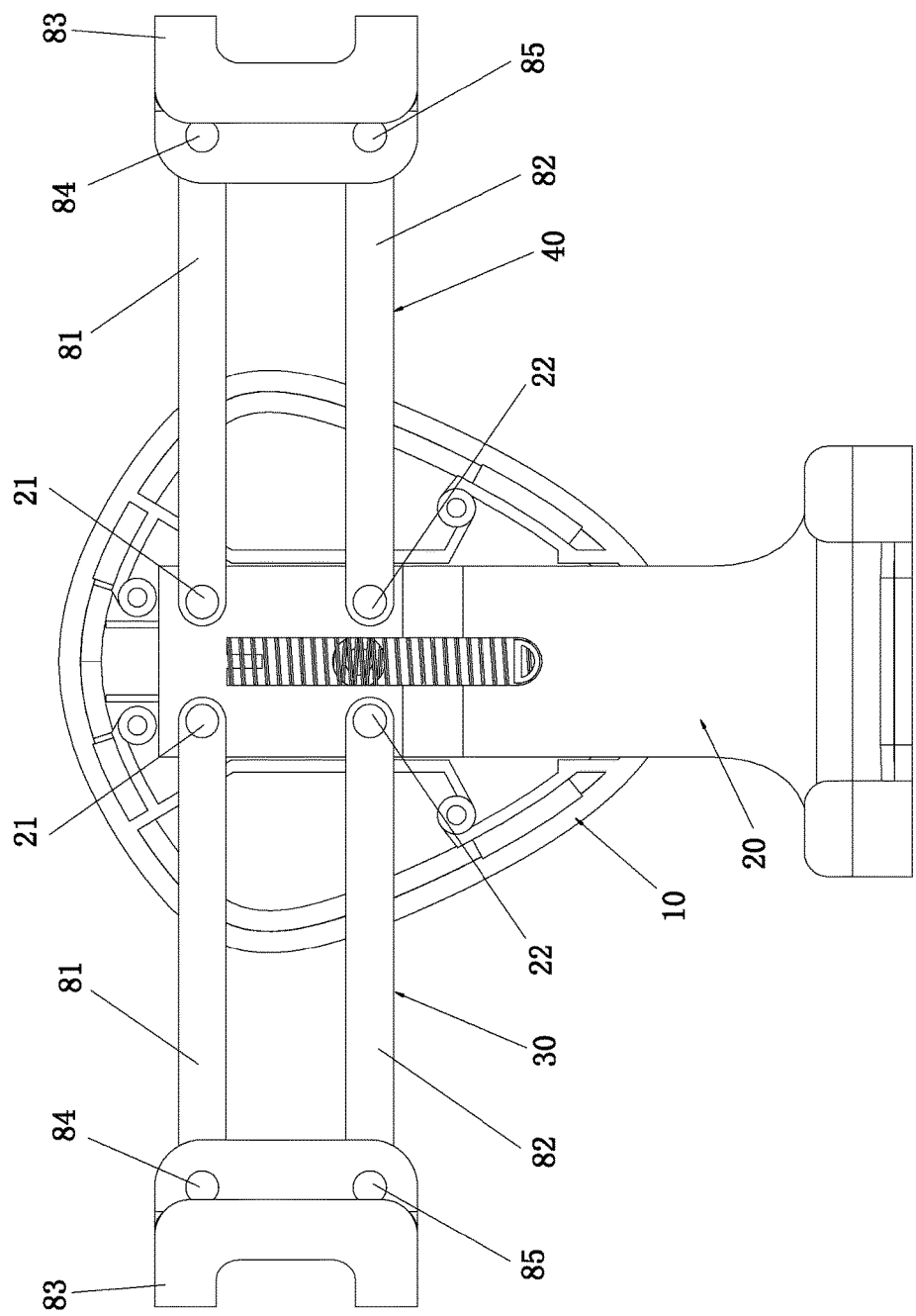
FIG. 3 is a partial assembled schematic view according to the embodiment of the present invention.

A front cover 60 is assembled to the front of the rear base 10. The front cover 60 is provided with a connecting post. The rear base 10 is provided with a connecting hole corresponding to the connecting post. The front cover 60 is provided with two limit bars 61 arranged right and left and spaced a distance apart from each other, providing a certain positioning for the return elastic element 50. An accommodation chamber is formed between the front cover 60 and the rear base 10. The first connecting rod 81, the second connecting rod 82, the bottom support arm 20 and the return elastic element 50 are all located in the accommodation chamber. The bottom, the left side and the right side of the accommodation chamber are provided with openings communicating with the outside, respectively. The outer ends of the first connecting rod 81 and the second connecting rod 82 and the bottom end of the bottom support arm 20 extend out from the corresponding openings, respectively. The openings at the left and right sides of the accommodation chamber each have an upper limit surface 62 and a lower limit surface 63 for limiting the displacement range of the left clamping arm 30 and the right clamping arm 40. The positions of the upper limit surface 62 and the lower limit surface 63 are determined by the size of the mobile device, such as the mobile phone, for the left clamping arm 30 and the right clamping arm 40 to clamp the mobile device. The lower limit surface 63 also functions as the aforesaid limit portion. In this embodiment, as shown in FIG. 2, the upper limit surface 62 and the lower limit surface 63 are disposed on the front cover 60. Of course, the upper limit surface 62 and the lower limit surface 63 may be disposed on the rear base 10, or the upper limit surface 62 and the lower limit surface 63 are disposed on the front cover 60 and the rear base 10 respectively and then assembled, but not limited thereto.

When a mobile device, such as a mobile phone, is placed on the holder, the bottom support arm 20 is moved downward by the weight of the mobile phone. By the deformation principle of the parallelogram, the clamping parts 83 of the left clamping arm 30 and the right clamping arm 40 are moved inward obliquely upward along with the outer ends of the first connecting rods 81 and the second connecting rods 82 so as to clamp the mobile phone automatically. When the mobile phone is taken out, the bottom support arm 20 is released from the weight of the mobile device, the bottom support arm 20 is displaced upward along with the returning of the return elastic member 50, meanwhile, the clamping parts 83 of the left clamping arm 30 and the right clamping arm 40 are moved outward obliquely downward along with the outer ends of the first connecting rods 81 and the second connecting rods 82 so as to release the mobile device.

One end of the return elastic member 50 is fixed to the rear base 10, and another end of the return elastic member 50 is connected to the bottom support arm 20 for returning the bottom support arm 20 upward. The return elastic member may be designed as a pressure elastic member or a tension elastic member, etc., but not limited to a conventional pressure spring and a tension spring. It may be any elastic member able to return upward when the weight of a mobile device is released. In case the return elastic member 50 is a pressure elastic member, it is preferably a pressure spring. A lower end of the pressure spring is connected to the rear base 10, and an upper end of the pressure spring is connected to or leans against the bottom support arm 20. In this embodiment, the bottom support arm 20 is provided with a vertical receiving groove 23. A top of the receiving groove 21 is connected with a mounting post 24 extending downward. The pressure elastic member is a pressure spring. An upper end of the pressure spring is fitted on the outer circumference of the mounting post 24. The rear base 10 is provided with a guide post 11 protruding forward. The guide post 11 extends into the receiving groove 23. A lower end of the pressure spring is connected to the guide post 11. This ensures a precise vertical movement of the bottom support arm 20. In case the return elastic member 50 is an extension elastic member, it is preferably an extension spring. The return elastic member 50 may be an elastic rubber band or an elastic rubber strap according to the demand. An upper end of the tension elastic member is connected to the rear base 10, and a lower end of the tension elastic member is connected to the bottom support arm 20. The return elastic member referred to herein is not limited to the illustrated pressure spring, the tension spring, the elastic rubber band, and the elastic rubber strap. It may be other different suitable return elastic members.

The back of the rear base 10 is provided with a mounting seat 70 for installing the fully-automatic clamping holder. In general, a mobile phone holder is mounted to a vehicle by means of a sucking disc or fixed to the outlet of the air conditioner. The embodiment of FIG. 2 illustrates a mounting seat to be fixed the outlet of the air conditioner. However, this is not limited to the mounting structure. The clamping holder of the present invention may be applicable to a variety of mounting seats.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A parallelogram linkage automatic clamping holder, comprising a rear base, a bottom support arm mounted to the rear base, a left clamping arm and a right clamping arm connected to two sides of the bottom support arm, a return elastic member being provided and fixed to the rear base, the return elastic member extending in a vertical direction and being used for linking the bottom support arm to return upward, one end of the return elastic member being fixed to the rear base, another end of the return elastic member being connected to the bottom support arm;

the left clamping arm and the right clamping arm each including a clamping part, a first connecting rod, and a second connecting rod; the bottom support arm being provided with a first fulcrum and a second fulcrum arranged vertically and spaced a distance apart from each other corresponding to the left clamping arm and the right clamping arm, the clamping part being provided with a third fulcrum and a fourth fulcrum arranged vertically and spaced a distance apart from each other; inner and outer ends of the first connecting rod being pivotally connected to the corresponding first fulcrum and the third fulcrum respectively, inner and outer ends of the second connecting rod being pivotally connected to the corresponding second fulcrum and the fourth rotation fulcrum respectively, the first fulcrum, the second fulcrum, the fourth fulcrum and the third fulcrum being sequentially connected to form a parallelogram structure;

the parallelogram linkage automatic clamping holder further comprising two limit portions for providing the left clamping arm and the right clamping arm with deformation fulcrums respectively, the two limit portions being fixed to the rear base.

2. The parallelogram linkage automatic clamping holder as claimed in claim 1, wherein the second fulcrum is located directly below the first fulcrum in the vertical direction; and the fourth fulcrum is located directly below the third fulcrum in the vertical direction.

3. The parallelogram linkage automatic clamping holder as claimed in claim 1, wherein the return elastic member is a pressure elastic member; a lower end of the pressure elastic member is connected to the rear base, and an upper end of the pressure elastic member is connected to or leans against the bottom support arm.

4. The parallelogram linkage automatic clamping holder as claimed in claim 3, wherein the bottom support arm is provided with a vertical receiving groove, a top of the receiving groove is connected with a mounting post extending downward, the pressure elastic member is a pressure spring, an upper end of the pressure spring is fitted on the mounting post; the rear base is provided with a guide post protruding forward, the guide post extends into the receiving groove, and a lower end of the pressure spring is connected to the guide post.

5. The parallelogram linkage automatic clamping holder as claimed in claim 1, wherein the return elastic member is one of a tension spring, an elastic rubber band and an elastic rubber strap, an upper end of the return elastic member is connected to the rear base, and a lower end of the return elastic member is connected to the bottom support arm.

6. The parallelogram linkage automatic clamping holder as claimed in claim 1, wherein a front cover is assembled to a front of the rear base, an accommodation chamber is formed between the front cover and the rear base, the first connecting rod, the second connecting rod, the bottom support arm and the return elastic element are located in the accommodation chamber, a bottom, a left side and a right side of the accommodation chamber are provided with openings respectively, and the outer ends of the first connecting rod and the second connecting rod and a bottom end of the bottom support arm extend out from the corresponding openings, respectively.

7. The parallelogram linkage automatic clamping holder as claimed in claim 1, wherein a back of the rear base is provided with a mounting seat for installing the parallelogram linkage automatic clamping holder.

* * * * *